United States Patent
Kume et al.

(10) Patent No.: US 9,186,680 B2
(45) Date of Patent: Nov. 17, 2015

(54) CARBON MATERIAL AND ELECTRICITY STORAGE DEVICE

(71) Applicants: Tetsuya Kume, Kakegawa (JP); Yuko Matsumura, Kakegawa (JP); Yasuyuki Higaonna, Kakegawa (JP)

(72) Inventors: Tetsuya Kume, Kakegawa (JP); Yuko Matsumura, Kakegawa (JP); Yasuyuki Higaonna, Kakegawa (JP)

(73) Assignee: CATALER CORPORATION, Shizuoka (JP)

( * ) Notice: Subject to any disclaimer, the term of this patent is extended or adjusted under 35 U.S.C. 154(b) by 0 days.

(21) Appl. No.: 14/278,739

(22) Filed: May 15, 2014

(65) Prior Publication Data

US 2014/0291425 A1 Oct. 2, 2014

Related U.S. Application Data

(60) Division of application No. 13/087,264, filed on Apr. 14, 2011, which is a continuation of application No. PCT/JP2009/067864, filed on Oct. 15, 2009.

(30) Foreign Application Priority Data

Oct. 15, 2008 (JP) ................. 2008-266647

(51) Int. Cl.
*H01M 8/10* (2006.01)
*B02C 19/00* (2006.01)
(Continued)

(52) U.S. Cl.
CPC ............. *B02C 19/0018* (2013.01); *B82Y 30/00* (2013.01); *B82Y 40/00* (2013.01); *C01B 31/02* (2013.01); *C01B 31/0206* (2013.01); *C01B 31/14* (2013.01); *H01G 11/24* (2013.01); *H01G 11/32* (2013.01); *Y02E 60/13* (2013.01); *Y10T 428/2982* (2015.01)

(58) Field of Classification Search
CPC ....................................................... H01M 8/10
See application file for complete search history.

(56) References Cited

U.S. PATENT DOCUMENTS 4,745,096 A * 5/1988 Keogh ........................... 502/413
6,064,560 A 5/2000 Hirahara et al.
(Continued)

FOREIGN PATENT DOCUMENTS

JP 9-293507 A 11/1997
JP 9-328308 A 12/1997
(Continued)

OTHER PUBLICATIONS

International Search Report mailed Jan. 12, 2010, for PCT Application No. PCT/JP2009/067864, with English Translation, six pages.
(Continued)

*Primary Examiner* — Jacob Marks
(74) *Attorney, Agent, or Firm* — John P. White; Cooper & Dunham LLP

(57) ABSTRACT

Achieved is an electricity storage device having a low internal resistance and a high energy density. In a pore distribution, which is obtained for a carbon material using a BJH method and is plotted on a graph with a pore diameter D on the abscissa and a derivative $\Delta V/\Delta D$ of a pore volume per unit mass or unit volume with respect to the pore diameter D on the ordinate, a ratio M1/M2 of the maximum value M1 of the derivative $\Delta V/\Delta D$ in an interval of the pore diameter D from 10 to 100 nm with respect to the maximum value M2 of the derivative $\Delta V/\Delta D$ in an interval of the pore diameter D from 2 to 10 nm is 1.5 or more.

4 Claims, 3 Drawing Sheets

(51) Int. Cl.
  *B82Y 30/00*    (2011.01)
  *B82Y 40/00*    (2011.01)
  *C01B 31/02*    (2006.01)
  *H01G 11/24*    (2013.01)
  *H01G 11/32*    (2013.01)
  *C01B 31/14*    (2006.01)

(56) References Cited

U.S. PATENT DOCUMENTS

| | | |
|---|---|---|
| 2004/0023118 A1 | 2/2004 | Kinoshita et al. |
| 2006/0281004 A1 | 12/2006 | Yata et al. |
| 2007/0104981 A1 | 5/2007 | Lam et al. |
| 2008/0176142 A1 | 7/2008 | Inagaki et al. |
| 2009/0220775 A1 | 9/2009 | Kurosaki et al. |
| 2011/0195312 A1 | 8/2011 | Kume et al. |

FOREIGN PATENT DOCUMENTS

| | | |
|---|---|---|
| JP | 10-208985 A | 8/1998 |
| JP | 10-297912 A | 11/1998 |
| JP | 2006-016271 A | 1/2006 |
| JP | 2006-324183 A | 11/2006 |
| WO | WO 2007/126118 A1 | 11/2007 |

OTHER PUBLICATIONS

Notification of Transmittal of Translation of the International Preliminary Report on Patentability and International Preliminary Report on Patentability, in connection with PCT/JP2009/067864, issued May 17, 2011.
Office Action issued Nov. 14, 2011 in connection with U.S. Appl. No. 13/087,264, filed Apr. 14, 2011.
Response to Office Action issued Nov. 14, 2011, filed Feb. 14, 2012, in connection with U.S. Appl. No. 13/087,264, filed Apr. 14, 2011.
Office Action issued May 24, 2012 in connection with U.S Appl. No. 13/087,264, filed Apr. 14, 2011.
Response to Office Action issued May 24, 2012, filed Oct. 24, 2012 in connection with U.S. Appl. No. 13/087,264, filed Apr. 14, 2011.
Notice of Appeal filed Nov. 26, 2012 in connection with U.S. Appl. No. 13/087,264, filed Apr. 14, 2011.
Advisory Action issued Dec. 4, 2012 in connection with U.S. Appl. No. 13/087,264, filed Apr. 14, 2011.
Response filed Mar. 15, 2013 in connection with U.S. Appl. No. 13/087,264, filed Apr. 14, 2011.
Office Action issued Apr. 26, 2013 in connection with U.S. Appl. No. 13/087,264, filed Apr. 14, 2011.
Response to Office Action issued Apr. 26, 2013, filed Sep. 26, 2013 in connection with U.S. Appl. No. 13/087,264, filed Apr. 14, 2011.
Office Action issued Oct. 17, 2013 in connection with U.S. Appl. No. 13/087,264, filed Apr. 14, 2011.
Response to Office Action issued Oct. 17, 2013, filed Feb. 18, 2014 in connection with U.S. Appl. No. 13/087,264, filed Apr. 14, 2011.
Advisory Action issued Apr. 9, 2014 in connection with U.S. Appl. No. 13/087,264, filed Apr. 14, 2011.
Notice of Appeal filed Apr. 14, 2014 in connection with U.S. Appl. No. 13/087,264, filed Apr. 14, 2011.

* cited by examiner

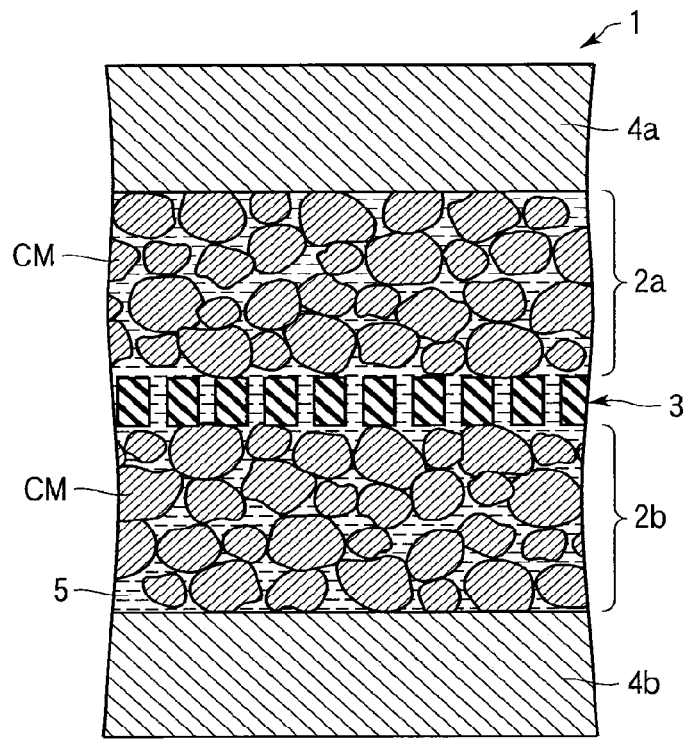
F I G. 3
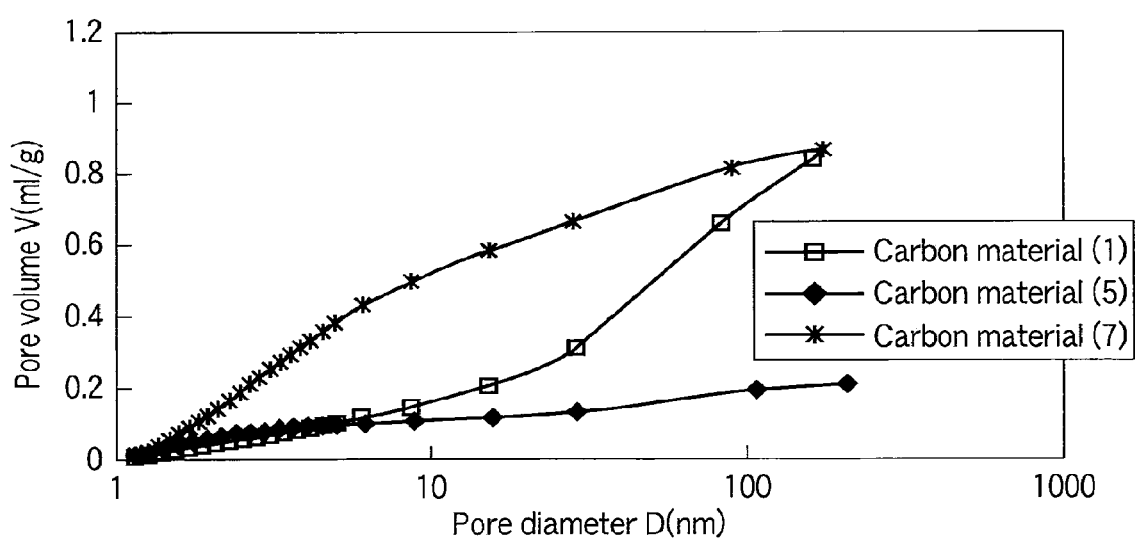
F I G. 4

CARBON MATERIAL AND ELECTRICITY STORAGE DEVICE

CROSS REFERENCE TO RELATED APPLICATIONS

This application is a divisional of U.S. Ser. No. 13/087,264, filed Apr. 14, 2011, which is a continuation of PCT International Application No. PCT/JP2009/067864, filed Oct. 15, 2009, which claims priority of Japanese Patent Application No. 2008-266647, filed Oct. 15, 2008, the contents of each of which are hereby incorporated by reference in their entirety into this application.

BACKGROUND OF THE INVENTION

1. Field of the Invention

The present invention relates to a carbon material and an electricity storage device.

2. Description of the Related Art

Carbon materials can be used in electrodes of electricity storage devices such as electric double-layer capacitors, hybrid capacitors and lithium-ion secondary batteries.

For example, JP-A 9-293507 describes use of fine powder produced by carbonizing a phenol resin as a material for a negative electrode of a lithium-ion secondary battery. This fine powder features a cumulative pore volume V1 of 0.05 to 0.35 mL/g for a pore diameter interval of 0.28 to 0.50 nm, a ratio V2/V1 of 0.30 or less, which is a ratio of a cumulative pore volume V2 for a pore diameter interval of 0.50 to 1.0 nm with respect to the cumulative pore volume V1, and a ratio V3/V1 of 0.25 or less, which is a ratio of a cumulative pore volume V3 for a pore diameter interval of 1.0 nm or more with respect to the cumulative pore volume V1. The fine powder also features a specific surface area of 1 to 500 m$^2$/g, an average particle diameter of 0.1 to 50 μm, and an atomic ratio of hydrogen atoms with respect to carbon atoms of 0.02 to 0.35.

JP-A 2006-324183 describes use of carbon particles having particle diameters of 100 nm to 10 μm as a material for a negative electrode of a lithium-ion secondary battery. This second patent document also describes use of an activated carbon having particle diameters of 100 nm to 10 μm, a pore diameter of 2 to 5 nm, and a pore volume of 0.1 to 2.0 mL/g for a pore diameter interval of 2 to 5 nm as an active material of an electric double-layer capacitor.

BRIEF SUMMARY OF THE INVENTION

An object of the present invention is to make it possible to achieve an electricity storage device having a low internal resistance and a high energy density.

According to a first aspect of the present invention, there is provided a carbon material having a pore distribution, which is obtained by a BJH method and is plotted on a graph with a pore diameter D on the abscissa and a derivative ΔV/ΔD of a pore volume per unit mass or unit volume with respect to the pore diameter D on the ordinate, such that a ratio M1/M2 of the maximum value M1 of the derivative ΔV/ΔD in an interval of the pore diameter D from 10 to 100 nm with respect to the maximum value M2 of the derivative ΔV/ΔD in an interval of the pore diameter D from 2 to 10 nm is 1.5 or more.

According to a second aspect of the present invention, there is provided an electricity storage device comprising a first electrode including the carbon material according to the first aspect, a second electrode spaced apart from the first electrode, and an electrolyte interposed between the first and second electrodes.

BRIEF DESCRIPTION OF THE SEVERAL VIEWS OF THE DRAWING

FIG. 3 is a cross sectional view schematically showing an example of an electric double-layer capacitor;

FIG. 4 is a graph showing cumulative pore volume;

DETAILED DESCRIPTION OF THE INVENTION

Figure 1:
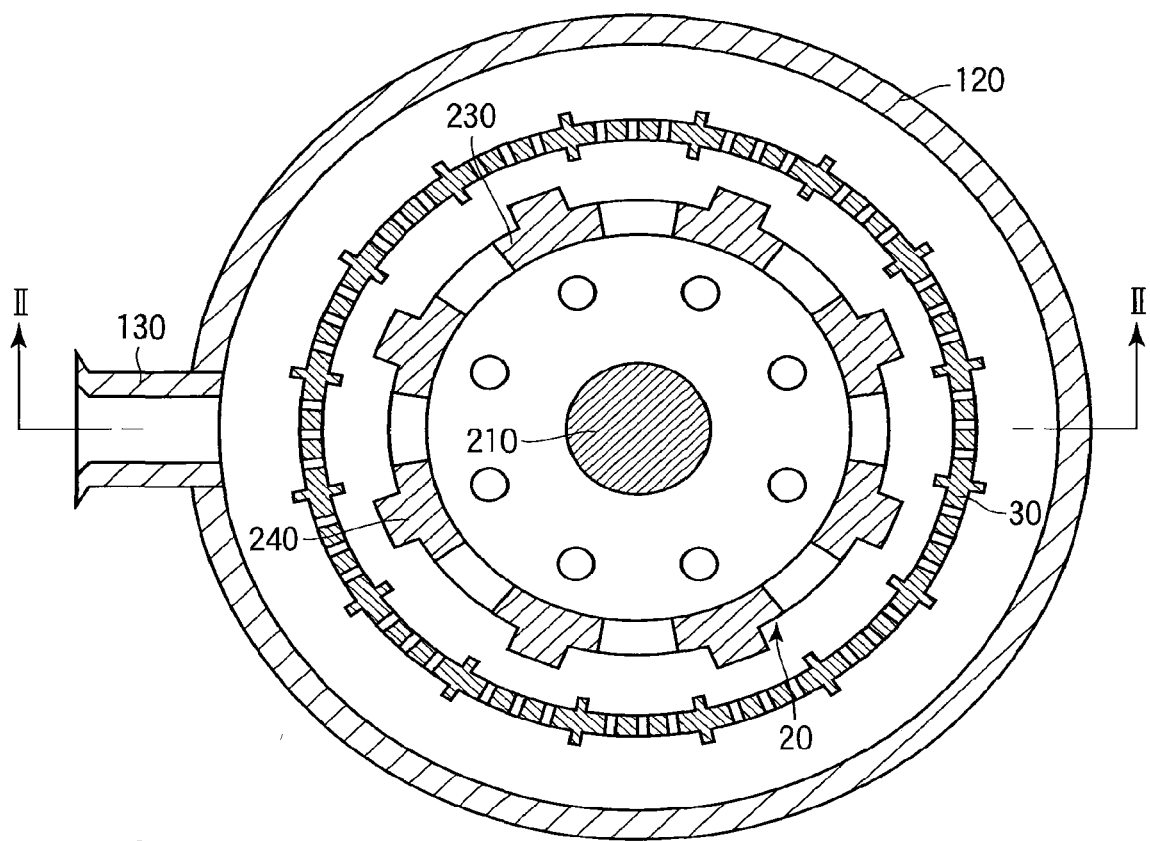
FIG. 1 is a sectional view schematically showing an example of a grinding mill.

An embodiment of the present invention will be described below with reference to the accompanying drawings. Note that the same reference numerals in the drawings denote components that achieve the same or similar functions, and a repetitive explanation thereof will be omitted.

In general, in the case where an activated carbon having a relatively large specific surface area is used in an electrode of an electricity storage device such as an electric double-layer capacitor, hybrid capacitor or lithium-ion secondary battery, a low internal resistance can be achieved. However, in the case of using such an activated carbon in the electrode of the electricity storage device, achieving a high energy density is impossible or difficult.

On the other hand, in the case where an activated carbon having a relatively small specific surface area is used in an electrode of an electricity storage device, a high energy density can be achieved. However, in this case, achieving a low internal resistance is impossible or difficult.

The present inventors has found that the carbon material produced by the method described below has a pore distribution different from those of other carbon materials and that using this carbon material makes it possible to achieve an electricity storage device having a low internal resistance and a high energy density. The method of manufacturing the carbon material will be described below.

First, a solid material is prepared as a raw material of the carbon material. For example, a coal- or petroleum-based coke is used as the solid material. The solid material is coarse-crushed using, for example, a hammer mill.

Then, the coarse-crushed product is subjected to a carbonization treatment. Specifically, the coarse-crushed product is dried by distillation in an inert atmosphere. This makes it possible to obtain a material having the following properties.

$$SSA \leq 10 \text{ m}^2/\text{g}$$

$$d_{002} = 0.355 - 0.365 \text{ nm}$$

$$DM \leq 300 \text{ μm}$$

Here, the abbreviation "SSA" represents a specific surface area obtained using a BET adsorption isotherm. The abbreviation "$d_{002}$" represents an interplanar spacing for the (002) plane obtained by measurement using the X-ray diffraction method. The abbreviation "DM" represents a volume mean diameter obtained by measurement of a particle size distribution using the laser diffraction scattering method.

These physical properties vary depending on the physical and chemical properties of the raw material and the conditions of the carbonization treatment. Typically, the temperature of the carbonization treatment is set within a range of 600 to 900° C. and the duration thereof is set within a range of 0.5 to 2 hours.

Then, the carbonized material is subjected to a primary grinding. For example, Bantam Mill is used for the primary grinding. The primary grinding is performed such that the ground product has an average particle diameter of 100 µm or less.

Then, the primary ground material is subjected to an activation treatment. For example, a mixture of the primary ground material and a caustic alkali is heat-treated in an inert atmosphere. Typically, an alkali metal other than lithium is used as the alkali metal of the caustic alkali. Subsequently, washing such as pressure filtration washing is performed on the material to remove an excessive alkali content, etc. For example, the washing is performed using pure water as a cleaning solution and repeated until the pH value of the pure water after use reaches 6 to 8. Thereafter, the washed material is dried and the dried material is then subjected to a secondary grinding. For example, a dry ball mill is used for the secondary grinding.

The processes from the activation treatment to the secondary grinding allow the secondary ground material to have the following physical properties.

$SSA \leq 1000$ m$^2$/g $d_{002} = 0.365$–$0.380$ nm $DM = 3$–$20$ µm

The physical properties of the secondary ground material depend on the physical and chemical properties of the carbonized material, the conditions of the processes performed thereafter, etc. For the activation treatment, for example, the amount of the caustic alkali is set 1 to 10 times the amount of the carbonized material on a mass basis, the temperature of the heat treatment performed in an inert atmosphere is set within a range of 600 to 900° C., and the duration thereof is set within a range of 1 to 16 hours.

Then, the activated carbon after the secondary grinding is subjected to an ultrafine-grinding. Specifically, the above activated carbon is subjected to a wet centrifugal grinding. This process decreases the average particle diameter of the activated carbon to, for example, 0.1 to 1.0 µm. The wet centrifugal grinding will be described later in more detail.

Subsequently, the activated carbon after the ultrafine-grinding is separated from the grinding media and then dried. For example, a spray drier is used for the drying.

Then, the activated carbon after dried is subjected to a reducing treatment. For example, the activated carbon is heated in a reducing atmosphere at 600 to 900° C. for 1 to 16 hours.

Thus, an ultrafine-ground activated carbon is obtained as the carbon material.

As above, in this method, the activated carbon is ultrafine-ground by wet centrifugal grinding. The centrifugal grinding method can achieve a small average particle diameter that other grinding methods, for example, dry grinding method cannot achieve. The wet centrifugal grinding method will be described with reference to FIGS. 1 and 2.

Figure 2:
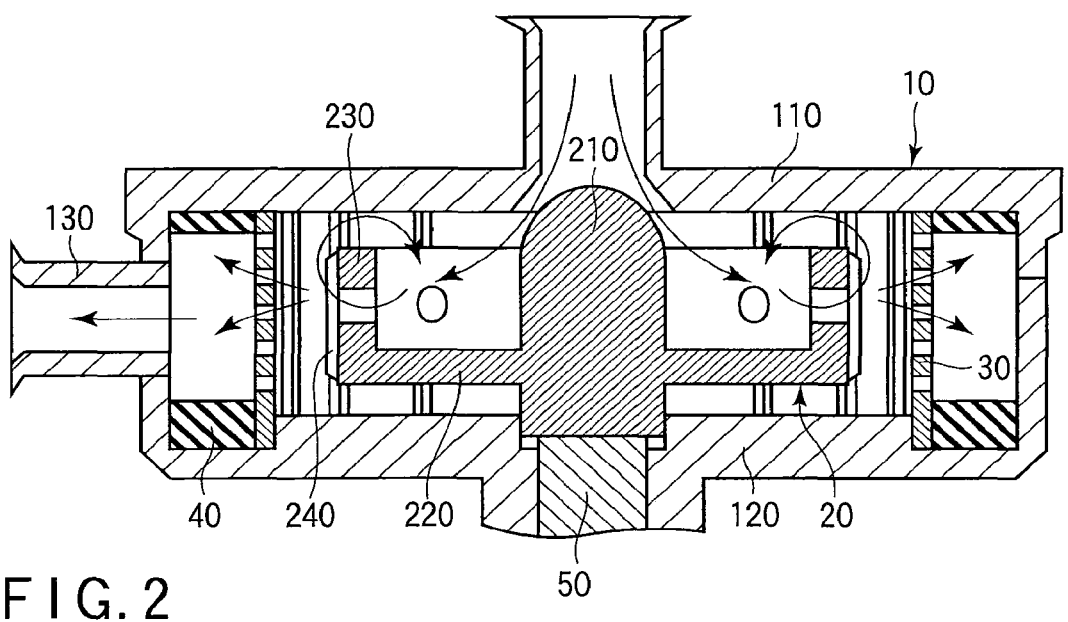
FIG. 2 is a cross sectional view taken along the line II-II of the grinding mill shown in FIG. 1.

FIG. 1 is a sectional view schematically showing an example of a grinding mill. FIG. 2 is a cross sectional view taken along the line II-II of the grinding mill shown in FIG. 1.

The grinding mill includes a chamber 10. The chamber 10 includes an upper plate 110, a lower plate 120 and a discharge pipe 130.

The upper plate 110 is approximately disk-shaped. One of the main surfaces of the upper plate 110 protrudes at the periphery thereof. The upper plate 110 is provided at approximately the center thereof with an opening for use as a slurry supply port.

The lower plate 120 is approximately disk-shaped. One of the main surfaces of the lower plate 120 protrudes at the periphery thereof and a circular groove is provided on the main surface inside the periphery. Further, the lower plate 120 is provided at approximately the center thereof with a through-hole.

The upper plate 110 and the lower plate 120 are arranged such that the protruding peripheries, that is, sidewall portions are in contact with each other so as to form an approximately column-shaped enclosed space therebetween.

The discharge pipe 130 is attached to the sidewall portions. The discharge pipe 130 allows the internal space that the upper plate 110 and the lower plate 120 form to communicate with the external space.

In the chamber 10, a rotor 20, a separator 30 and a spacer 40 are arranged.

The rotor 20 includes a protruding portion 210, a bottom plate 220, a sidewall 230 and fins 240.

The protruding portion 210 has a columnar shape with one of the ends forward-tapered. The other end of the protruding portion 230 is supported by one end of a shaft 50, which is inserted in the through-hole provided in the lower plate 120. The forward-tapered end of the protruding portion 210 faces the opening of the upper plate 110.

The bottom plate 220 is disk-shaped and has a through-hole at the center portion thereof. The bottom plate is provided with through-holes at portions spaced apart from the center portion and the periphery thereof. The protruding portion 210 is fitted in the through-hole at the center portion to support the bottom plate 220.

The sidewall 230 has a cylindrical shape. The sidewall 230 is provided with through-holes, which are arranged in the circumferential direction. The bottom plate 220 supports the sidewall 230 such that the cylindrical surface of the sidewall 230 is perpendicular to one of the main surfaces of the bottom plate 220.

The fins 240 are supported by the sidewall 230. The fins 240 are arranged on the outer surface of the sidewall 230 in the circumferential direction such that their main surfaces are perpendicular or inclined with respect to the main surface of the bottom plate 220.

The separator 30 has a cylindrical shape. The separator 30 is provided with through-holes having diameters smaller than the diameters of the through-holes of the bottom plate 220 provided at the positions spaced apart from the center portion and the diameters of the through-holes of the sidewall 230. The separator is further provided with protrusions on the inner surface thereof. The separator 30 is fitted in the groove on the lower plate 120.

The spacer 40 is interposed between the separator 30 and the upper plate 110 and between the separator 30 and the lower plate 120. The spacer prevents the deformation of the separator 30 when a force is exerted on the inner surface of the separator 30.

In the manufacture of the above-described carbon material, the activated carbon after the secondary grinding is ultrafine-ground using, for example, this grinding mill.

Specifically, the rotor 20 is rotated at high speed. Then, grinding media or a slurry containing grinding media and a dispersion medium are/is supplied into the chamber 10 through the slurry supply port provided in the upper plate 110.

The grinding media are, for example, spherical bodies made of ceramic. The grinding media are smaller than the through-holes provided in the bottom plate 220 at the positions spaced apart from the center portion and the through-holes of the sidewall 230 and are larger than the through-holes of the separator 30. As the dispersion medium, for example, water is used.

The grinding media that reach the tip of the protruding portion 210 move toward the inner surface of the sidewall 230 by the action of the centrifugal force and gravity. Since the sidewall 230 is provided with the through-holes, the grinding media that reach the inner surface of the sidewall 230 further move toward the inner surface of the separator 30 through the through-holes by the action of the centrifugal force. The grinding media accumulate on the inner surface of the separator 30 to form a layer thereon.

The grinding media on the inner surface of the separator 30 moves on the inner surface of the separator in the circumferential direction by the action of the fins 240. Here, the protrusions on the inner surface of the separator 30 hinder the movement of the grinding media in the circumferential direction. In addition, since the grinding media are localized between the separator 30 and the sidewall 230 using the centrifugal force, the density of the grinding media in this space can be increased. Therefore, a strong share force can be exerted on the grinding media.

Some of the grinding media return to the recessed portion, which the bottom plate 220 and the sidewall 230 form, through the opening of the upper plate 110 or the through-holes of the bottom plate 220. Subsequently, the grinding media pass through the trough-holes of the sidewall 230 by the action of the centrifugal force and then collide at high speed against the grinding media moving on the inner surface of the separator 30 in the circumferential direction.

As above, the grinding media move in the space between the separator 30 and the sidewall 230 in the circumferential direction and circulate between this space and the space surrounded by the sidewall 230. Further, even in the case where the grinding media are small, exerting a strong share force and causing high-speed collision of the grinding media against one another are possible because the centrifugal force is utilized.

Then, a slurry containing the activated carbon after the secondary grinding and a dispersion medium is supplied into the chamber 10 through the slurry supply port of the upper plate 110 while the high-speed rotation of the rotor 20 is maintained. The concentration of the activated carbon in the slurry is set within, for example, a range of 1% to 10% by mass. As the dispersion medium, for example, water is used.

The slurry that reach the tip of the protruding portion 210 move toward the inner surface of the sidewall 230 by the action of the centrifugal force and gravity. The slurry is mixed with the grinding media in the space surrounded by the sidewall 230, passes through the through-holes of the sidewall 230, and then meets the flow of the grinding media moving in the space between the separator 30 and the sidewall 230.

In the flow of the grinding media, the activated carbon in the slurry is ground by the actions of the above-described share force and the collision of the grinding media against one another. The ground activated carbon passes through the separator 30 together with the dispersion liquid. The activated carbon and the dispersion liquid having passed through the separator 30 further pass as a slurry through the discharge pipe 130. Thus, a slurry containing the ground activated carbon is obtained.

Then, the grinding particles in the chamber 10 are replaced with ones having smaller diameters, and the separator 30 is replaced with one whose through-holes have smaller diameters, if necessary. Subsequently, almost the same grinding as that described above is performed except for using the slurry containing the activated carbon ground by the grinding mill shown in FIGS. 1 and 2 in place of the slurry containing the activated carbon just after the secondary grinding. Note that various conditions including the rotation speed of the rotor 20 and the supply rate of the slurry may be appropriately changed, if necessary.

The above-described replacement of the grinding particles, etc. and the grinding are repeated until an activated carbon having a desired particle diameter is obtained. For example, grinding particles having diameters of 0.2 to 1.0 mm are used in the first grinding treatment, and grinding particles having diameters of 0.05 to 0.2 mm are used in the final grinding treatment. Thus, a slurry containing an ultrafine-ground activated carbon can be obtained.

Note that the ultrafine-ground activated carbon cannot be obtained using a commonly used grinding mill such as a ball mill, vibration mill, rotor mill, hummer mill, jet mill or planetary mill. This is because that each of these grinding mills lacks one or more of the following requirements necessary for ultrafine-grinding of the activated carbon: use of small grinding media; high-frequency collision of the grinding media against each other; strong force on the activated carbon exerted by the grinding media; etc.

In the case where grinding is performed by a dry process using the grinding mill shown in FIGS. 1 and 2, even if the activated carbon can be ultrafine-ground, collecting the ultrafine-ground activated carbon is impossible in reality. This is because that the ultrafine-ground activate carbon passes through a filter such as a bag filter.

The carbon material obtained by the above-described method has the following physical properties. That is, when a pore distribution curve is obtained by the BJH (Barrett-Joyner-Halenda) method and is plotted on a graph with a pore diameter D on the abscissa and a derivative $\Delta V/\Delta D$ of a pore volume per unit mass or unit volume with respect to the pore diameter D on the ordinate, the maximum value M1 of the derivative $\Delta V/\Delta D$ in an interval of the pore diameter D from 10 to 100 nm is greater than the maximum value M2 of the derivative $\Delta V/\Delta D$ in an interval of the pore diameter D from 2 to 10 nm. To be more specific, the ratio M1/M2 of the maximum value M1 with respect to the maximum value M2 is 1.5 or more. The ratio M1/M2 is, for example, 2 or more, and preferably 4 or more. Typically, the ratio M1/M2 is 10 or less.

Typically, the derivative $\Delta V/\Delta D$ increases as the pore diameter D increases in an interval of the pore diameter D from 10 to 100 nm. In other words, in the interval of the pore diameter D from 10 to 100 nm, typically, the derivative $\Delta V/\Delta D$ monotonically increases as the pore diameter D increases.

The physical properties of the carbon material satisfy, for example, the following relationships.

$SSA \leq 1500 \text{ m}^2/\text{g}$ $d_{002} = 0.365 - 0.380 \text{ nm}$ $DM = 0.1 - 1 \text{ μm}$ Typically, the physical properties of the carbon material satisfy the following relationships.

$SSA \leq 1000 \text{ m}^2/\text{g}$ $d_{002} = 0.365 - 0.380 \text{ nm}$ $DM = 0.1 - 0.5 \text{ μm}$ The pore distribution curve is obtained by the following method.

First, in a nitrogen gas atmosphere at 77.4 K (boiling point of nitrogen), the amount (cc/g) of nitrogen gas adsorbed by the carbon material is measured at each pressure P (mmHg) of the nitrogen gas while gradually increasing the pressure P. Then, assuming the value obtained by dividing the pressure P (mmHg) by the saturation vapor pressure $P_0$ of nitrogen gas as a relative pressure $P/P_0$, the amounts of adsorbed nitrogen are plotted for each relative pressure $P/P_0$ to obtain an adsorption isotherm. Then, using this adsorption isotherm, a pore distribution is obtained by the BJH method. The pore distribution curve can be thus obtained. Note that the BJH method is described in, for example, J. Am. Chem. Soc. (1951), 73, pp. 373-380, etc.

Although the reason why use of this carbon material makes it possible to achieve an electricity storage device having a low internal resistance and a high energy density is not exactly identified, the present inventors consider it as follows.

A carbon material obtained by the same method as that described above except for omitting the ultrafine-grinding has a crystal structure suitable for intercalation of ions such as lithium ions. Therefore, in the case of using this carbon material, an electricity storage device having a high energy density can be achieved.

However, this carbon material has a small volume of pores into which the electrolyte solution can diffuse. Therefore, in order for the ions in the electrolyte solution to be stored at the center of the carbon material particle or in order for the ions stored at the center to be emitted into the electrolyte solution, the ions must move in the carbon material over great distances. For this reason, in the case of using the carbon material obtained by the same method as that described above except for omitting the ultrafine-grinding, achieving a low internal resistance is impossible or very difficult.

By contrast, the carbon material produced by the above-described method has a pore distribution obtained by the BJH in which the ratio M1/M2 of the maximum value M1 of the above-described derivative in the pore diameter interval of 10 to 100 nm with respect to the maximum value M2 of the above-described derivative in the pore diameter interval of 2 to 10 nm is great. That is, the volume of pores into which the electrolyte solution can diffuse is high. Therefore, in the case of using this carbon material, an electricity storage device having a low internal resistance and a high energy density can be achieved.

In the case of using this carbon material in an electrode of an electricity storage device, movement of the electrolyte solution is less prone to occur because the carbon material has a large volume of pores into which the electrolyte solution can diffuse. Thus, use of the carbon material makes it possible to obtain an electricity storage device that is less prone to cause expansion thereof.

As the carbon material, it is preferable to use the one in which the derivative $\Delta V/\Delta D$ monotonically increases as the pore diameter D increases from 10 nm to 100 nm. Such a carbon material is advantageous in achieving a lower internal resistance and a higher energy density as compared with a carbon material in which the derivative $\Delta V/\Delta D$ does not monotonically increase as the pore diameter D increases from 10 to 100 nm.

The ratio M1/M2 is preferably 2 or more and more preferably 2.5 or more. A carbon material having a higher ratio M1/M2 is advantageous in achieving a lower internal resistance and a higher energy density.

The ratio M1/M2 is preferably 10 or less and more preferably 7 or less. The ion storage capacity of the carbon material is closely related to a total volume of pores having small pore diameters D, for example, pores having pore diameters D of 10 nm or less. In general, a carbon material having a small maximum value M2 of the derivative $\Delta V/\Delta D$ in an interval of the pore diameter D from 2 to 10 nm is low in number of pores having pore diameters D of 10 nm or less. Thus, in the case of using a carbon material in which the ratio M1/M2 is excessively high, achieving a high energy density is difficult.

The specific surface area SSA of the carbon material is preferably 1,500 m$^2$/g or less and more preferably 1,000 m$^2$/g or less. This specific surface area SSA is preferably 200 m$^2$/g or more and more preferably 300 m$^2$/g or more. In the case of using a carbon material having a specific surface area SSA that falls within the above range, a higher energy density can be achieved as compared with the case of using a carbon material having a specific surface area SSA that is outside the above range.

The average particle diameter DM of the carbon material is preferably 0.1 µm or more, more preferably 0.3 µm or more, and most preferably 0.5 µm or more. This average particle diameter DM is preferably 1.2 µm or less, more preferably 1 µm or less, more preferably 0.9 µm or less, more preferably 0.8 µm or less, and most preferably 0.7 µm or less. In the case of using a carbon material having an average particle diameter DM within the above-described range, most of the gaps among the carbon material particles function similarly to the pores of the carbonaceous particles. Therefore, in the case of using a carbon material having an average particle diameter D within the above-described range, a higher energy density can be achieved as compared with the case of using a carbon material having an average particle diameter D outside the above-described range.

The carbon material can be used in an electrode of an electricity storage device such as an electric double-layer capacitor, hybrid capacitor and lithium-ion secondary battery. For example, the carbon material can be included in one or more of the polarizable electrodes of an electric double-layer capacitor. Alternatively, the carbon material can be included in a negative electrode of a lithium-ion secondary battery.

FIG. 3 is a cross sectional view schematically showing an example of an electric double-layer capacitor.

The electric double-layer capacitor 1 includes a pair of polarizable electrodes 2a and 2b facing each other. A separator 3 is interposed between the polarizable electrodes 2a and 2b. Charge collectors 4a and 4b are provided on the outer surfaces of the polarizable electrodes 2a and 2b, respectively. The polarizable electrodes 2a and 2b, the separator 3, and the charge collectors 4a and 4b are contained in a casing (not shown).

The electric double-layer capacitor 1 is further provided with a pair of lead electrodes (not shown) for use in charge and discharge. Ends of the lead electrodes are connected to the charge collectors 4a and 4b, while other ends of the lead electrodes are positioned outside the casing.

At least one of the polarizable electrodes 2a and 2b includes the carbon material as an electrode material. The polarizable electrodes 2a and 2b are porous bodies formed by agglomerating a carbon material CM and are impregnated with a nonaqueous electrolyte solution 5. The carbon material CM of at least one, typically both of the polarizable electrodes 2a and 2b includes the carbon material obtained by the above-described method.

The polarizable electrodes 2a and 2b can further include a material other than the carbon material CM. For example, the polarizable electrodes 2a and 2b may further include a conductive adjuvant such as carbon black and/or a binder such as polytetrafluoroethylene (PTFE).

The separator 3 is made of a dielectric material having an ion-permeability and prevents the short-circuit between the polarizable electrode 2a and the polarizable electrode 2b. As the separator 3, for example, a porous separator made of polypropylene or polyethylene can be used.

As the material of the charge collectors 4a and 4b, for example, a metal or alloy such as aluminum can be used.

The nonaqueous electrolyte solution 5 is an aprotic solution containing an electrolyte and an organic solvent. As the electrolyte, for example, a material that produces a cation such as tetraalkylammonium ion and an anion such as tetrafluoroborate ion, hexafluorophosphate ion or perchlorate ion when ionized can be used. Examples of the tetraalkylammonium ion includes $Me_4N^+$, $Et_nMe_{4-n}N^+$, $Et_4N^+$ and n-$Bu_4N^+$. Here, "ME" represents a methyl group, "Et" represents an ethyl group, and "Bu" represents a butyl group.

As the organic solvent of the nonaqueous electrolyte solution 5, for example, dimethoxyethane, diethoxyethane, γ-butyrolactone, acetonitrile or a mixture thereof can be used. The organic solvent may further include, for example, propionitrile, ethylene carbonate, dimethyl sulfoxide, nitromethane or a mixture thereof.

EXAMPLES

Examples of the present invention will be described below.

Example 1

In the present example, a carbon material was manufactured by the following method.

First, a petroleum coke was coarse-crushed using a hammer. By this coarse-crushing, a coarse-crushed product having particle diameters of about 6 mm to about 7 mm was obtained.

Then, the coarse-crushed product was subjected to a carbonization treatment. Specifically, the coarse-crushed product charged into a crucible made of nickel was heated in an inert atmosphere at about 750° C. for about 1 hour. For this dry distillation, a vertical furnace manufactured by MINO CERAMIC CO., LTD. was used.

Then, the carbonized material was subjected to a primary grinding. Bantam Mill was used for the primary grinding. The primary grinding was performed such that the ground product had an average particle diameter of 100 μm or less.

Then, the primary ground material was subjected to an activation treatment using an alkali metal. Specifically, the primary ground material and potassium hydroxide were mixed together at a mass ratio of 1:2, and the mixture thus prepared was charged into a crucible made of nickel. Then, the mixture was heated in an inert atmosphere at about 800° C. for about 4 hours. For the activation, the above-described vertical furnace was used.

Subsequently, a pressure filtration washing was performed on the material. Here, pure water was used as a cleaning solution. The washing was repeated until the pH value of the pure water after use reached 7.

Thereafter, the washed material was dried. For the drying, used was a dryer with a temperature thereof set at 115° C.

Next, the dried material was subjected to a secondary grinding. Specifically, the dried product and spherical grinding media made of ceramic were charged into a vessel made of ceramic, and the vessel was located on a vibration mill manufactured by URAS TECHNO CO., LTD. Then, 15 minutes of grinding treatment was performed thereon to obtain a secondary grinded product having an average particle diameter of about 8 μm.

Then, the activated carbon after the secondary grinding was subjected to an ultrafine-grinding. Specifically, the above activated carbon was subjected to almost the same wet centrifugal grinding as that described with reference to FIGS. 1 and 2. Here, used was a slurry containing the activated carbon after the secondary grinding at a concentration of 5% by mass. Water was used as a dispersion medium of the slurry. A wet- and circulation-type grinding mill SC100 manufactured by MITSUI MINING CO., LTD. was used for the wet centrifugal grinding. Grinding media having a diameter of 0.2 mm were used in the first grinding treatment and grinding media having a diameter of 0.48 μm were used in the final grinding treatment. Thus, a slurry containing an activated carbon having an average particle diameter of 0.48 μm was obtained.

Subsequently, the slurry containing the activated carbon after the ultrafine-grinding and the dispersion medium was separated from the grinding media and then the activated carbon was dried. For the drying, used was a spray drier MDL-050B manufactured by FUJISAKI ELECTRIC. CO., LTD.

Then, the activated carbon after dried was subjected to a reducing treatment. Specifically, the activated carbon was heated in a reducing atmosphere at 700° C. for 8 hours. For the reducing treatment, used was a horizontal furnace manufactured by ROKEN KOGYO CO., LTD.

Thus, an ultrafine-ground activated carbon was obtained as the carbon material. Hereinafter, the activate carbon is referred to as "carbon material (1)".

Example 2

An ultrafine-ground activated carbon was manufactured by the same method as that described in Example 1 except that the ultrafine-grinding was so performed to obtain a slurry containing an activated carbon with an average particle diameter of 0.56 μm. Hereinafter, the activate carbon is referred to as "carbon material (2)".

Example 3

An ultrafine-ground activated carbon was manufactured by the same method as that described in Example 1 except that the ultrafine-grinding was so performed to obtain a slurry containing an activated carbon with an average particle diameter of 0.85 μm. Hereinafter, the activate carbon is referred to as "carbon material (3)".

Example 4

An ultrafine-ground activated carbon was manufactured by the same method as that described in Example 1 except that the ultrafine-grinding was so performed to obtain a slurry containing an activated carbon with an average particle diameter of 1.20 μm. Hereinafter, the activate carbon is referred to as "carbon material (4)".

Example 5

An ultrafine-ground activated carbon was manufactured by the same method as that described in Example 1 except that the ultrafine-grinding was omitted. Hereinafter, the activate carbon is referred to as "carbon material (5)".

Example 6

Prepared was Ketjen Black 300JD, which was an activated carbon manufactured by MITSUBISHI CHEMICAL CORPORATION and marketed by LION CORPORATION. Hereinafter, the activated carbon is referred to as "carbon material (6)".

Example 7

An ultrafine-ground activated carbon was manufactured by the same method as that described in Example 1 except that the activation treatment was performed with the mass ratio of the material just after the primary grinding to the potassium hydroxide set at 1:2.5 and that the ultrafine-grinding was so performed to obtain a slurry containing an activated carbon with an average particle diameter of 0.51 μm. Hereinafter, the activate carbon is referred to as "carbon material (7)".

Example 8

An ultrafine-ground activated carbon was manufactured by the same method as that described in Example 1 except that the activation treatment was performed with the mass ratio of the material just after the primary grinding to the potassium hydroxide set at 1:3 and that the ultrafine-grinding was so performed to obtain a slurry containing an activated carbon with an average particle diameter of 0.55 μm. Hereinafter, the activate carbon is referred to as "carbon material (8)".

Example 9

In the present example, a carbonaceous material from coconut shell was subjected to a water vapor activation treatment. Specifically, the carbonaceous material was left stand in a water vapor atmosphere at 900° C. to obtain an activated carbon having a specific surface area of 2,000 m²/g.

After grinding the activated carbon, the ground product thus obtained was subjected to the same secondary grinding as that described in Example 1. Then, the secondary ground product was ultrafine-ground by the same method as that described in Example 1 except that the ultrafine-grinding was so performed to obtain a slurry containing an activated carbon with an average particle diameter of 0.88 μm. Hereinafter, the activate carbon is referred to as "carbon material (9)".

<Evaluation 1>

An average particle diameter, pore distribution and bulk density were measured on each of the carbon materials (1) to (9). For the measurement of the average particle diameter, used was a laser diffraction particle size analyzer SALD-3000 manufactured by SHIMADZU CORPORATION. Here, the measurement diffractive index was 2.00-0.20i, and pure water was used as a dispersion medium. For the measurement of the pore distribution, used was NOVA-3000 manufactured by QUANTACHROME CORPORATION. Specifically, 0.0275 g of the carbon material dried at 115° C. for 1 hour or more was weighed and placed in the above instrument for pore distribution measurement. It was then dried in vacuum at 350° C. for 3 hours. Thereafter, an amount of adsorbed nitrogen was measured, and the pore distribution was analyzed using the BJH method. The results are shown in TABLE 1 below and FIGS. 4 to 6.

In TABLE 1, "Monotonic increase", "Convex upward" and "Almost constant" in the column headlined with "Change in $\Delta V/\Delta D$" indicate the shapes of the pore distribution curves in the interval of the pore diameter D from 10 to 100 nm, which are plotted on a graph with the pore diameter D on the abscissa and the derivative $\Delta V/\Delta D$ on the ordinate.

FIG. 4 is a graph showing cumulative pore volume. In FIG. 4, the abscissa is the pore diameter D, while the ordinate is the cumulative pore volume V.

Figure 5:
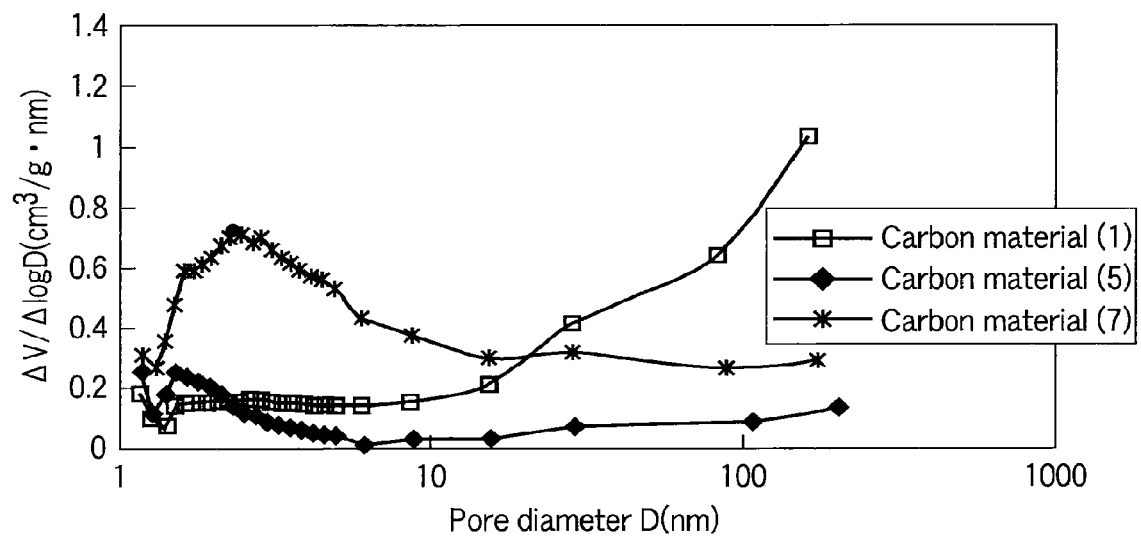
FIG. 5 is a graph showing a pore distribution in which the pore volume is represented as a pore volume per unit mass.
Figure 6:
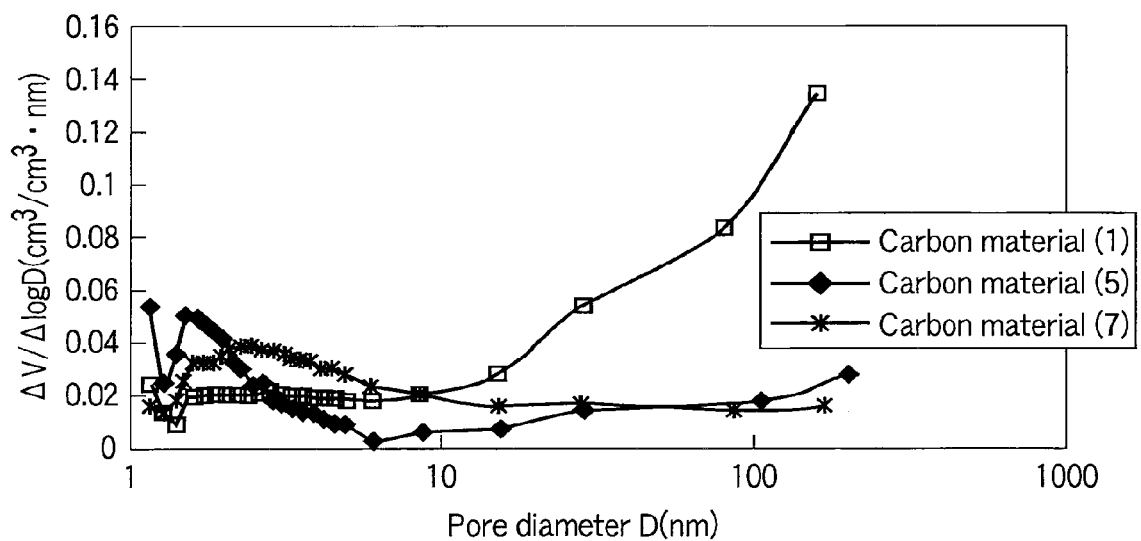
FIG. 6 is a graph showing a pore distribution in which the pore volume is represented as a pore volume per unit volume.

FIG. 5 is a graph showing a pore distribution in which the pore volume is represented as a pore volume per unit mass. FIG. 6 is a graph showing a pore distribution in which the pore volume is represented as a pore volume per unit volume. In each of FIGS. 5 and 6, the abscissa is the pore diameter D, while the ordinate is the derivative $\Delta V/\Delta D$ of the pore volume V with respect to the pore diameter D.

In FIGS. 5 and 6, the derivative $\Delta V/\Delta D$ is indicated as "V/ΔD log D" because the abscissa is a logarithmic coordinate. Note that the pore distribution curves for the carbon materials (2) to (4), (7) and (8) are omitted in FIGS. 4 to 6 because they have almost the same shapes as the pore distribution curve for the carbon material (1). Note also that the pore distribution curve for the carbon material (9) is omitted in FIGS. 4 to 6 because it has an extremely high peak in the interval of the pore diameter D from 1 to 3 nm and thus plotting this on the graph makes the other curves difficult to see.

<Manufacture of Electrodes>

The carbon material (1) was dried in vacuum at 110° C. for 2 hours. Then, 80 parts by mass of the carbon material (1), 10 parts by mass of carbon black, and a polyethylene terephthalate (PTFE) solution containing 10 parts by mass of PTFE were kneaded sufficiently. Subsequently, the mixture was rolled into a sheet having a thickness of 0.1 mm, and then cut into a square shape having an area of 25 cm². Hereinafter, the electrode thus obtained is referred to as "electrode (1)".

Next, electrodes were manufactured by the same method as that described for the electrode (1) except that the carbon materials (2) to (9) were used instead of the carbon material (1). Hereinafter, the electrodes obtained using the carbon materials (2), (3), (4), (5), (6), (7), (8) and (9) are referred to as "electrode (2)", "electrode (3)", "electrode (4)", "electrode (5)", "electrode (6)", "electrode (7)", "electrode (8)" and "electrode (9)", respectively.

TABLE 1

| Carbon material | Average particle diameter (μm) | Specific surface area (m²/g) | Pore volume for 5-100 nm (ml/g) | Pore volume for 5-100 nm (ml/ml) | M1 (cm³/g · nm) | M2 (cm³/g · nm) | M1/M2 | Change in $\Delta V/\Delta D$ | d002 (nm) | Bulk density of powder (g/ml) |
|---|---|---|---|---|---|---|---|---|---|---|
| (1) | 0.48 | 300 | 0.75 | 0.098 | 0.725 | 0.166 | 4.38 | Monotonic increase | 0.368 | 0.130 |
| (2) | 0.56 | 300 | 0.49 | 0.066 | 0.440 | 0.169 | 2.61 | Convex upward | 0.367 | 0.135 |
| (3) | 0.85 | 300 | 0.32 | 0.050 | 0.505 | 0.195 | 2.58 | Monotonic increase | 0.368 | 0.155 |
| (4) | 1.20 | 300 | 0.14 | 0.026 | 0.140 | 0.166 | 0.84 | Monotonic increase | 0.368 | 0.182 |
| (5) | 8.00 | 300 | 0.10 | 0.019 | 0.085 | 0.202 | 0.42 | Almost constant | 0.367 | 0.204 |
| (6) | 0.60 | 300 | 0.45 | 0.024 | 0.219 | 0.166 | 1.32 | Monotonic increase | 0.365 | 0.054 |
| (7) | 0.51 | 500 | 0.81 | 0.102 | 0.530 | 0.234 | 2.27 | Monotonic increase | 0.368 | 0.125 |
| (8) | 0.55 | 900 | 0.90 | 0.104 | 0.490 | 0.320 | 1.53 | Monotonic increase | 0.367 | 0.116 |
| (9) | 0.88 | 2000 | 0.53 | 0.050 | 0.346 | 2.20 | 0.16 | Monotonic increase | 0.394 | 0.094 |

<Manufacture of Electrochemical Cells>

A three-electrode cell was manufactured using the electrode (1) as each of the working electrode and the counter electrode and a lithium foil as a reference electrode. As the electrolyte solution of the three-electrode cell, used was a propylene carbonate solution containing $Et_4N.BF_4$ at a concentration of 1 mol/L. Hereinafter, the three-electrode cell is referred to as "cell (1)".

Next, three-electrode cells were manufactured by the same method as that described for the cell (1) except that the electrodes (2) to (9) were used instead of the electrode (1). Hereinafter, the three-electrode cells obtained using the electrodes (2), (3), (4), (5), (6), (7), (8) and (9) are referred to as "cell (2)", "cell (3)", "cell (4)", "cell (5)", "cell (6)", "cell (7)", "cell (8)" and "cell (9)", respectively.

<Evaluation 2>

Measurements of the internal resistance and energy density were performed on each of the cells (1) to (9). For the measurements of the internal resistance and energy density, used was a battery charge/discharge unit HJ-1005 SMSA manufactured by HOKUTO DENKO CORPORATION.

Specifically, charge/discharge tests were performed first under a constant current condition. That is, each of the cells (1) to (9) was charged using the charge/discharge unit. For the charging, a constant current was made to flow under the temperature condition at 25° C. until the voltage of the cell reached 4.0 V. After completing the charging, the cell was discharged at a constant output current of 250 mA until the cell voltage decreased to 2.0 V.

Next, charge/discharge tests were performed under a constant output condition. That is, each of the cells (1) to (9) was charged using the charge/discharge unit. For the charging, a constant current was made to flow under the temperature condition at 25° C. until the voltage of the cell reached 4.0 V. After completing the charging, the cell was discharged at a constant output of 1.500 W until the cell voltage decreased to 2.0 V.

Using the charge/discharge properties thus obtained, the internal resistances and the energy densities were obtained. Note that the internal resistance was calculated based on the voltage of the cell just after completing the charging, the voltage of the cell after 0.1 second had elapsed since discharging was started, and the amount of charges that were allowed to flow within this period.

The internal resistances and the energy densities obtained for the cells (1) to (9) are summarized in TABLE 2 below.

TABLE 2

| Electrode/cell | Density of Electrode (g/mL) | Internal resistance ($\Omega cm^2$) @250 mA | Energy density (mWh/mL) @250 mA | Internal resistance ($\Omega cm^2$) @1.5 kW | Energy density (mWh/mL) @1.5 kW |
|---|---|---|---|---|---|
| (1) | 0.85 | 14.2 | 18.6 | 5.8 | 10.9 |
| (2) | 0.89 | 15.9 | 16.7 | 6.1 | 10.1 |
| (3) | 0.90 | 18.7 | 12.6 | 7.3 | 8.3 |
| (4) | 0.91 | 21.4 | 9.4 | 7.9 | 6.5 |
| (5) | 0.98 | 24.1 | 7.6 | 8.8 | 4.2 |
| (6) | 0.50 | 20.3 | 2.1 | 6.8 | 1.9 |
| (7) | 0.82 | 13.7 | 15.7 | 5.4 | 9.7 |
| (8) | 0.78 | 12.1 | 14.0 | 4.8 | 8.6 |
| (9) | 0.66 | 45.2 | 4.1 | 16.8 | 1.3 |

As shown in TABLE 2, the energy densities of the cells (1) to (3), (7) and (8) are higher than those of the cells (4) to (6) and (9). In addition, the internal resistances of the cells (1) to (3), (7) and (8) are lower than those of the cells (4) to (6) and (9).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A method of producing a carbon material, comprising:
    coarse-crushing a solid material as a raw material of the carbon material;
    subjecting the coarse-crushed solid material to a carbonization treatment;
    subjecting the carbonized material to a primary grinding;
    mixing the primary ground material with a caustic alkali and heat treating the mixture;
    washing the heat-treated mixture using water to obtain a washed activated carbon;
    drying the activated carbon;
    subjecting the activated carbon to a secondary grinding;
    grinding the activated carbon by a wet centrifugal grinding method;
    drying the ground activated carbon; and
    subjecting the dried activated carbon to a reducing treatment.

2. The method according to claim 1, wherein the wet centrifugal grinding method is performed using a wet centrifugal grinding mill, and the grinding of the activated carbon by the wet centrifugal grinding method includes:
    replacing grinding media in the wet centrifugal grinding mill with ones having smaller diameters; and
    grinding the ground activated carbon by the wet centrifugal grinding mill after the replacement of the grinding media.

3. The method according to claim 2, wherein a cycle of the replacement of the grinding media and the grinding of the ground activated carbon is repeated.

4. The method according to claim 3, wherein the cycle is repeated such that the ground activated carbon has an average particle diameter of 0.1 to 1.0 μm.

* * * * *